United States Patent [19]

Bayley

[11] 4,165,588
[45] Aug. 28, 1979

[54] FURNITURE UNIT

[75] Inventor: James J. Bayley, Pittsford, N.Y.

[73] Assignee: Hardwood House Inc., Rochester, N.Y.

[21] Appl. No.: 923,172

[22] Filed: Jul. 10, 1978

[51] Int. Cl.² ............................................. E04B 1/48
[52] U.S. Cl. ......................................... 52/36; 52/238
[58] Field of Search .................. 52/36, 238, 241, 243, 52/481; 211/134

[56] References Cited

U.S. PATENT DOCUMENTS

| | | | |
|---|---|---|---|
| 2,558,173 | 6/1951 | Duff et al. | 52/36 X |
| 3,410,584 | 11/1968 | Bus | 52/36 X |
| 3,908,320 | 9/1975 | Hogue | 52/36 |
| 3,940,900 | 3/1976 | Russo | 52/238 |
| 4,012,880 | 3/1977 | Logie | 52/36 |

*Primary Examiner*—J. Karl Bell
*Attorney, Agent, or Firm*—Cumpston & Shaw

[57] ABSTRACT

A free standing furniture unit has a pair of spaced vertical posts, and connecting rods extend between upper and lower end portions of the posts. The connecting rods and the posts, when assembled, provide an open rectangular frame which receives a rectangular panel. The panel has an elongate notch along its lower edge thereof. The panel is positioned in the frame with the notch receiving the lower connecting rod, and then the panel is swung about the lower rod into its assembled position within the frame with the upper edge of the panel being positioned below the upper connecting rod. A locking member with an elongate notch along its lower edge fits over the upper connecting rod and extends between the two posts. The locking member and the upper edge of the panel have interlocking surfaces which secure the panel in its assembled position within the frame. In this manner the panel can be swung into position within the frame or removed therefrom without disassembly of the frame. The locking member is latched to the posts to complete the unit. The assembled unit is useable as a partition or portion of a wall, or with similar units to form portions of a desk unit, cabinet, shelving unit or combinations thereof.

8 Claims, 5 Drawing Figures

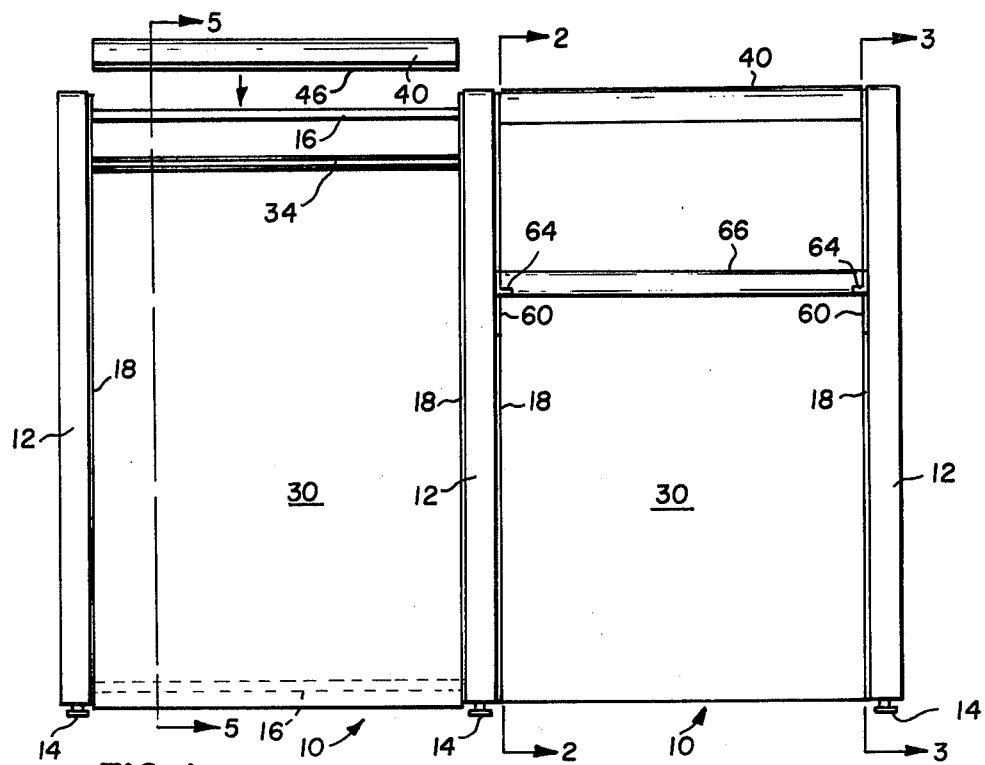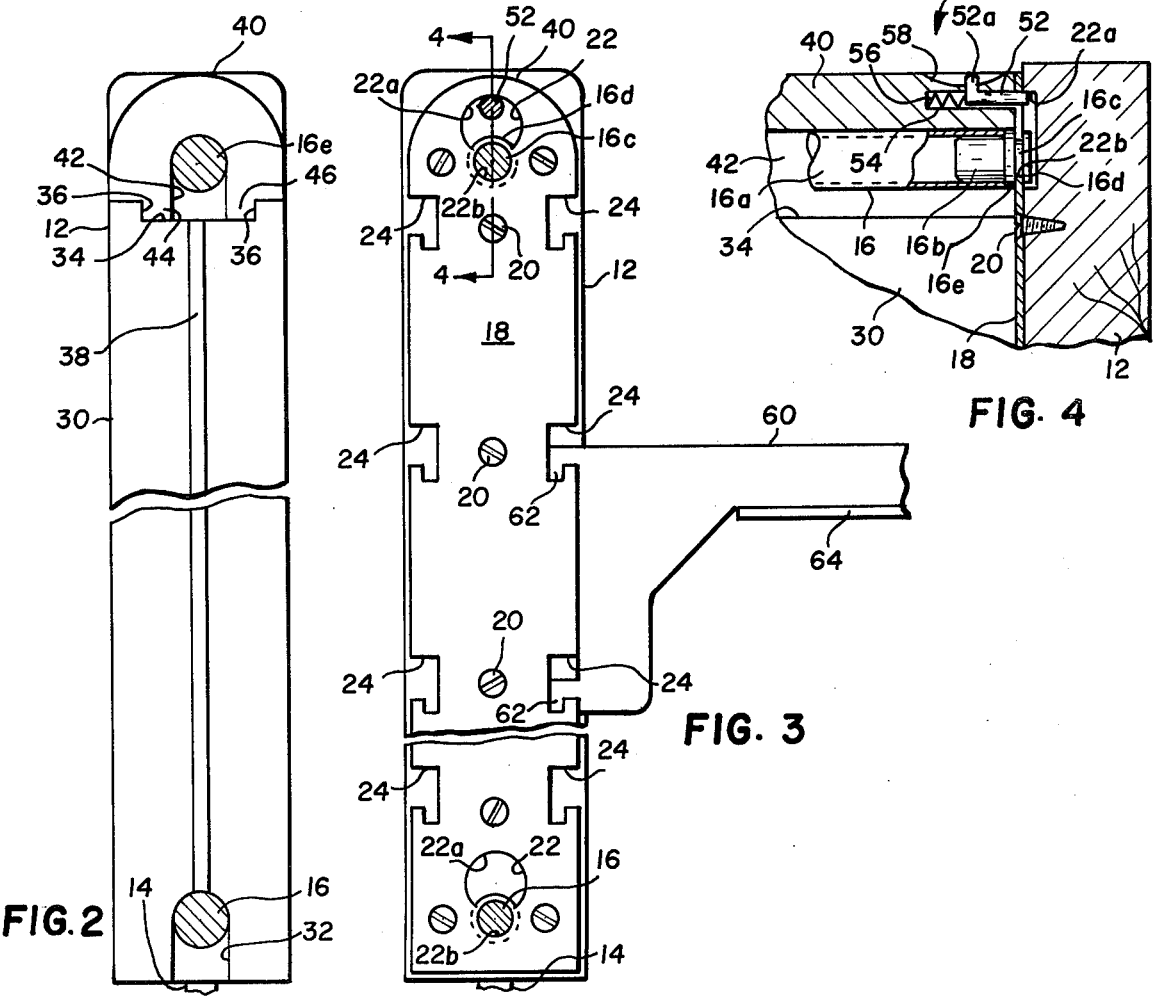

FURNITURE UNIT

BACKGROUND OF THE INVENTION

1. Field of the Invention

This invention relates generally to furniture units and, more specifically, to such units which are used as partitions or wall units, or as part of a desk, cabinet, or shelving unit.

2. Description of the Prior Art

Free standing furniture units are well known in the art. Such units typically have been constructed so that the central panel or surface of the unit forms an integral part of the overall unit, and insertion or removal of the panel requires disassembly of the unit. This limits the versatility of the units for a number of reasons. For example, difficulty in exchanging panel units discourages modifications of existing assembled units to vary esthetic appearance of the units, and also complicates and makes more expensive the interchange of functional panels as, for example, in such units that are used for portions of desks, wall cabinets and shelving units. Clearly it is advantageous to provide a furniture unit wherein the panel is not a load bearing element of the unit in order to simplify construction of the overall unit and to simplify interchange ability of panels during construction and by the purchaser of the units.

SUMMARY OF THE INVENTION

In accordance with the present invention, a furniture unit has a pair of spaced posts with upper and lower end portions. A lower connector member is secured to the lower end portion of each post and an upper connector member is secured to the upper member of each post, thereby defining an open frame. A panel is located between the posts and beneath the upper connector member so that the panel is insertable into and removable from the frame after assembly of the frame. A locking member is positioned over the upper connector member, and means are provided for latching the locking member to the posts. The locking member and the panel have cooperating interlocking surfaces for securing the panel in its assembled position within the frame.

BRIEF DESCRIPTION OF THE DRAWINGS

In the detailed description of the preferred embodiments of the invention presented below, reference is made to the accompanying drawings, in which:

FIG. 1 is an elevational view showing two interconnected furniture units of the present invention, one of which is illustrated in a final stage of assembly;

FIG. 2 is a cross-section taken along line 2—2 of FIG. 1;

FIG. 3 is a cross-section taken along line 3—3 of FIG. 1 and showing a mounting plate used in construction of the furniture unit;

FIG. 4 is an enlarged fragmentary cross-section view taken along line 4—4 of FIG. 3 and illustrating the connection of the upper connecting rod and the locking member to a post and mounting plate.

DESCRIPTION OF THE PREFERRED EMBODIMENTS

Figure 5:
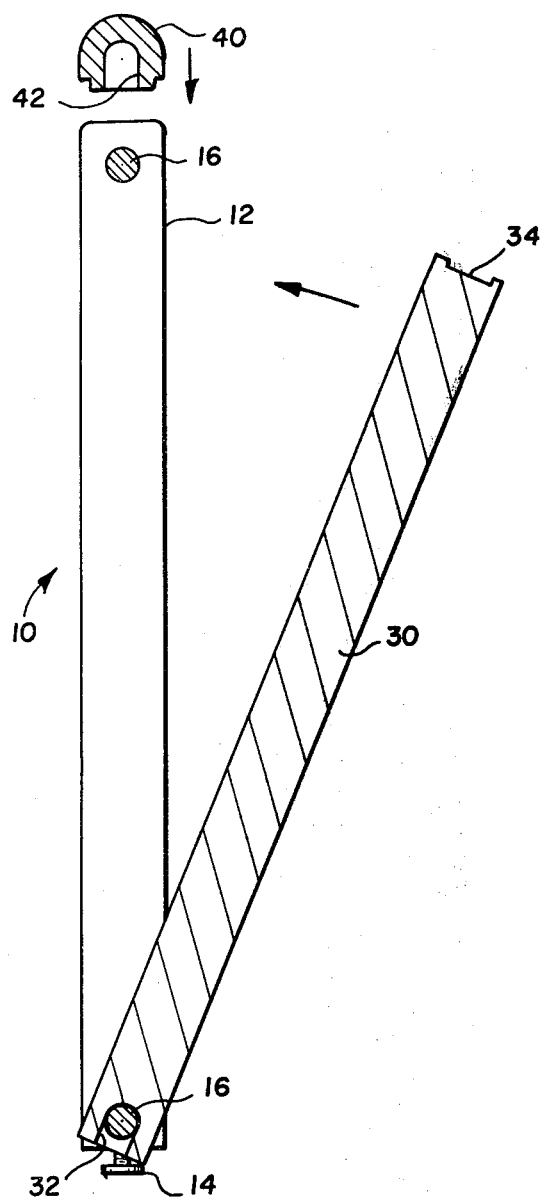
FIG. 5 is a cross-sectional view taken along line 5—5 of FIG. 1 and illustrating a final stage in the assembly of a furniture unit in accordance with the invention.

Referring now to the drawings in detail, FIG. 1 of the drawings illustrates two free standing furniture units of the invention connected end-to-end, each unit being generally designated by the reference numeral 10. Each furniture unit comprises a pair of spaced, vertical posts 12, and when two such units are connected end-to-end as illustrated in FIG. 1 the post between the two units is common to both units. The posts are generally rectangular in cross section, parallel to each other, and preferably are made of wood due to its desireability for high-quality furniture units. However, other types of material can be used if desired. Each post has an adjustable foot 14 at its lower end for leveling the unit.

The posts are interconnected by a pair of identical connecting rods 16 that extend between the upper and lower end portions of the posts. In order to facilitate attachment of the rods to the posts, each post has a mounting plate 18 (FIG. 3) secured to one face of the post. The plates are located on the posts so that they face each other in the assembled furniture unit 10. As shown in FIG. 3, the plate extends substantially the entire length of the post and is secured thereto by screws 20. Each plate 18 has upper and lower mounting slots 22. Each slot has a generally key-hole shape comprising upper and lower overlapping circular portions 22a and 22b, the lower portion 22b being somewhat smaller than the upper portion. Each plate 18 also preferably has a plurality of spaced recesses 24 along both side edges thereof for receiving mounting brackets as explained in more detail hereinafter. While the plates 18 are illustrated in FIG. 1 of the drawings in order to facilitate explanation of the construction of the furniture unit of the invention, in practice these plates are thin, are recessed slightly from the side edges of the posts and will be virtually hidden from view, thereby providing a more pleasing appearance to the furniture unit of the invention.

Referring now to FIG. 4 of the drawings, each connecting rod 16 preferably comprises a pipe 16a that is closed at each end by a mounting member 16b. The mounting members have an interference fit with the inner surface of the pipe and they close the ends of the pipe. Adjacent the outer end of each mounting member is a recessed neck portion designated 16c which is located between two collar portions 16d and 16e. The end portion 16d is somewhat smaller in diameter than the outside diameter of the pipe 16a and the portion 16e of the connecting member. The diameter of portion 16e is substantially the same as pipe 16a. The dimensions of portions 16c, 16d, and 16e are selected relative to slot 22 in plate 18 so that the portion 16e is larger in diameter than the larger potion 22a of the slot while the portion 16d is smaller in diameter than the portion 22a but larger in diameter than the portion 22b of the slot. The neck portion 16c, on the other hand, fits snugly into the lower portion 22b of the slot. When the neck 16c is within slot portion 22b, the collars 16d and 16e abut against the surface of plate 18 to provide a rigid connection between the rod and the plate. The posts 12 and upper and lower connecting rods 16, when assembled, jointly define an open, rectangular frame which comprises the structural or load bearing portion of the furniture unit of the invention.

After the frame has been assembled, a rectangular panel 30 is positioned within the frame. The panel has an elongate notch 32 that extends along the entire length of the lower edge of the panel. The inner portion of the notch is generally semicylindrical so that the lower end of the panel can be positioned within the frame with the lower connecting rod 16 being received within the notch 32 as shown in FIGS. 2 and 5. After the lower rod is received in the notch 32, the panel is swung into the frame as shown by the arrow in FIG. 5. This brings the upper edge of the panel within the frame and beneath the upper connecting rod 16. Thus the panel can be positioned within the frame without disassembling the frame or removing either or both of the connecting rods. For this reason insertion of the panels can be delayed until after the frames for a number of different units have been assembled. This also simplifies interchangeability of the panels since disassembly of the frame is not required for changing the panels.

Along the upper edge of panel 30 there is a flat groove 34 defined by spaced, parallel walls 36. The groove forms part of the structure for locking the panel in the frame as explained later.

Preferably each end of the panel has a sealing strip 38 (FIG. 2) that extends substantially the entire length of the panel and is adapted to engage one of the plates 18 to tightly seal the connection therebetween. This prevents light leakage between the panels and the post and produces a more attractive unit.

The panel is held in position within the frame by means of a locking member 40 which is substantially the same width as the panel. The locking member extends between the upper end portions of the posts 12, and it has an elongate notch 42 that extends throughout the length of the locking member and is preferably generally semi-cylindrical in shape at its inner end. The width of the notch is slightly greater than the width of the connecting rod 16. The locking member is positioned over the upper connecting rod with the rod being fully received within the notch as best shown in FIG. 2. The locking member has tongue portions 44 and 46 on opposite sides of the notch 42 that are dimensioned and positioned so that they fit within the groove 34 on the upper edge of the panel 30 with the side edges of the tongues engaging the walls 36 of the groove. The interlocking surfaces defined by the tongue and groove portions aid in securing the panel in its assembled position with the frame.

Latching means shown in FIG. 4 and generally designated 50 are provided at opposite ends of the locking member 40 for releasably securing the locking member in its assembled position between the posts 12. The latch comprises a generally L-shaped bolt 52 that is positioned within a hole 54 in the end of the locking member. The bolt is movable between an extended position (shown in FIG. 4) wherein it projects a slight distance from the end of the locking member and a retracted position (not shown) where it is fully received within the hole 54. The bolt is located in the locking member so that when it is extended it is received within the larger opening 22a of the slot 22 in plate 18 and is adjacent the upper end of that opening. The bolt is urged to its extended position by a spring 56 that is captured in the inner end of the hole 54 and bears against the bolt. An extension 52a of the bolt projects upwardly into a slot 58 in the top of the locking member so that the bolt is readily accesible by a person assembling or disassembling the unit. It is understood that a spring loaded bolt as shown in FIG. 4 is provided at each end of the locking member.

From the foregoing description it will be apparent that the locking member is held against upward movement by the bolt engaging the upper edge of slot portion 22a. Also, the locking member is held against downward movement by the fit between the upper connecting rod 16 and the slot 42 in the locking member and by the tongue and groove portions 44, 46 and 34. The locking member is held against rotation by the interconnecting, locking surfaces comprising the tongue portions 44 and 46 on the locking member and the groove 34 and parallel walls 36 on the upper edge of the panel. The structural elements that connect and latch the parts together are hidden from view, thereby improving the appearance of the completed unit, and the locking structure is relatively simple to manufacture and to use in assembly and disassembly of a unit.

The assembled furniture units can be used as wall units for dividing adjacent work spaces or room areas. However, the versatility of the unit is enhanced by providing means for supporting work surfaces or other functional elements directly on the furniture unit of the invention. As previously noted, the plates 18 have recesses 24 for receiving brackets, such as shown at 60 in FIGS. 1 and 3. The bracket 60 has locking fingers 62 which are positioned within the recesses 24 and then moved downwardly to lock the bracket in place on the plate 18. The particular bracket 60 illustrated in the drawings has a horizontally-extending flange 64 so that two such brackets which are the mirror image of each other can support a shelf 66 as shown in FIG. 1. Other types of brackets and supporting structures also can be used. For example, a bracket similar to the one shown in 60 can support a cabinet, or a bracket can be used for supporting a work surface, such as a desk top. Thus the placement of the bracket 60 and the particular element supported by it can be varied in order to achieve a highly versatile and very desireable furniture unit capable of dividing work areas, supporting shelves, cabinets desk tops or other functional elements.

Plate 18 can be placed on only one vertical surface of the post 12, as shown on the end posts 12 in FIG. 1, or on two such surfaces as shown for the center post 12 in FIG. 1. The FIG. 1 arrangement produces a relatively long wall. By placing the plates 18 on adjacent vertical surfaces of a post 12 two perpendicular wall units can be provided. Up to four plates 18 can be provided on the vertical surfaces of the post 12 in order to produce the arrangement desired for any particular situation.

As previously noted, typical prior furniture units incorporated a panel as shown at 30 as a structural element of the panel so that during assembly or disassembly of the unit the frame was not rigid or secure until the panel was secured in position. With the furniture unit of the present invention, on the other hand, the structural elements comprise posts 12, plates 18 and connecting rods 16. Thus a number of the frames can be quickly and easily assembled by simply interconnecting the rods 16 to posts 12 by placing the neck portions 16c of the rod into the slot 22 on plate 18 and pressing downwardly. When the frames have been assembled the panels 30 are quickly moved into position by first placing the lower end portion of the panel onto the lower connecting rod with the upper end portion at an angle to the frame as illustrated in FIG. 5. Then the panel is swung into its assembled position as shown by the arrow in FIG. 5, and the locking member 40 is moved downwardly over the upper connecting rod 16 with the tongue portions 44 and 46 of the connecting member being received within the groove 34 on the upper edge of the panel and with the side edges of the tongue portions abutting the parallel walls 36 of the groove 34. As the locking member is moved into position the bolts 52 are retracted against the force of springs 56, and then the bolts are released to allow the bolts to project from the ends of the locking members and extend into the upper portions 22a of the slots in the plates 18. This completes assembly of the furniture unit. The panels 30 can be rapidly removed or changed as required either to change the appearance of the unit or the functional requirements of the unit. Thus panels having fabric on the exterior surface for its pleasing appearance and its acoustic properties can be interchanged with panels having wood veneer to change the appearance or the functional use of the panel. Shelves, cabinets, work surfaces and the like can be added by means of brackets 60 as previously explained. Thus this relatively simple, easily assembled furniture unit is highly versatile and can be used in many environments.

The invention has been described in detail with particular reference to a preferred embodiment thereof, but it will be understood that variations and modifications can be effected within the spirit and scope of the invention.

What is claimed is:

1. A furniture unit comprising:
   a pair of spaced posts having upper and lower end portions;
   a lower connector member secured to the lower end portion of each post and an upper connector member secured to the upper end portion of each post, thereby defining an open frame;
   a panel located between the posts and beneath the upper connector member so that the panel is insertable into and removable from the frame after assembly of the frame;
   a locking member positioned over the upper connector member; and
   means for latching said locking member to said posts, said locking member and said panel having cooperating interlocking surfaces for securing the panel in its assembled position within the frame.

2. The furniture unit as set forth in claim 1 further comprising two metal plates, one plate being attached to each post, each of said plates having key-hole shaped slots in the upper and lower portions thereof, and said connector members each having recessed neck portions at the end portions thereof positioned in said slots.

3. A furniture unit as set forth in claim 2 wherein each of said plates has a plurality of openings therein, and a plurality of brackets positioned in said openings and adapted to support a shelf, cabinet or the like.

4. A furniture unit as set forth in claim 1 wherein said panel has a notch along the lower edge thereof which receives the lower connector member.

5. A furniture unit as set forth in claim 1 further comprising two sealing strips, one of said strips being located between one edge of said panel and one of the posts and the other strip being located between the opposite edge of the panel and the other of the posts, thereby providing light-tight connections between the panel and the posts.

6. A free standing furniture unit comprising:
   a pair of spaced vertical posts having upper and lower end portions;
   a lower connecting rod secured to the lower end portion of each post and an upper connecting rod secured to the upper end portion of each post, thereby providing an open rectangular frame;
   a rectangular panel having an elongate notch extending along a lower edge thereof, the panel being positioned within the frame with the lower connecting rod being received within said notch and with an upper edge of the panel being spaced from the upper connecting rod so that the lower edge of the panel can be placed on the lower rod and swung into its assembled position within the frame without first disconnecting the rods from the posts; and
   a locking member having an elongate notch extending along a lower edge thereof, the locking member extending between the upper end portions of said posts with the upper connecting rod being received within the notch in the locking member, the locking member and the upper edge of the panel having interlocking surfaces for securing the upper edge of the panel in its assembled position within the frame; and
   latching means for releasably securing the locking member between the posts.

7. A furniture unit as set forth in claim 6 further comprising:
   a pair of plates, one plate being secured to one of said posts and the second plate being secured to the second of said posts, said plates facing each other and extending substantially the entire length of said posts, each plate having upper and lower mounting slots adjacent the ends thereof, each of said slots being larger at the top than at the bottom, and said connecting rods each having neck portions at the ends thereof that are received within said slots for attaching said rods to said posts.

8. A furniture unit as set forth in claim 6 wherein said latching means comprises a pair of spring loaded bolts located at opposite ends of said locking members and movable into the top portion of the upper mounting slots.

* * * * *